United States Patent [19]

Rahme

[11] 3,788,747

[45] Jan. 29, 1974

[54] HEADLAMP AIMING DEVICE HAVING A PROTECTIVE HOUSING

[75] Inventor: Selim R. Rahme, St. Clair Shores, Mich.

[73] Assignee: A-OK Machine and Tool Company, Fraser, Mich.

[22] Filed: May 30, 1972

[21] Appl. No.: 257,687

[52] U.S. Cl. ............... 356/121, 33/180 L, 240/151
[51] Int. Cl. .......................................... G01b 11/26
[58] Field of Search... 356/172, 121, 154; 33/180 L, 33/288; 240/102, 151

[56] References Cited
UNITED STATES PATENTS
| | | | |
|---|---|---|---|
| 2,003,797 | 6/1935 | Arbuckle | 356/122 |
| 2,997,914 | 8/1961 | Hopkins | 33/180 L |
| 3,532,432 | 10/1970 | Mansour | 356/122 |
| 3,672,063 | 6/1972 | Hopkins et al. | 33/180 L |

Primary Examiner—Ronald L. Wibert
Assistant Examiner—S. K. Morrison
Attorney, Agent, or Firm—Andrew R. Basile

[57] ABSTRACT

A headlamp aiming device for properly aiming the headlamps of a vehicle. The device has a base member with a projection tube extending from one side thereof and concentrically arranged within a protective housing which, in turn, is connected to the base member by a plurality of circumferentially spaced shock absorbing spring assembly. A vacuum suction cup is carried on the opposite face of the base member. The base member carries an adapter ring which has means cooperating with the vehicle headlamp to permit a predetermined alignment between the headlamp and the device when the same is releasably attached to the headlamp by the action of the vacuum suction cup. A beam of light projected through the projection tube of the device strikes a target and when the beam of light has been adjusted to center on the target by the adjustment of the mounting screws on the headlamp bezel, the vehicle headlamp is properly aimed.

9 Claims, 6 Drawing Figures

HEADLAMP AIMING DEVICE HAVING A PROTECTIVE HOUSING

BACKGROUND OF THE INVENTION

I. Field of the Invention

The present invention relates to headlamp aiming devices particularly adapted to properly aim the headlamps of a vehicle such as an automobile, truck and the like.

II. Description of the Prior Art

Heretofore, headlamp aiming devices have been employed on automobile assembly lines in order to provide a simple means for properly aligning the automobile headlamps and although these previously used headlamp aiming devices have functioned in an acceptable manner, they are not very accurate and are extremely delicate, and thus require constant maintenance and readjustment in order to insure an accurate performance. In addition, such previously used devices employ costly lenses and lamps which, due to the construction of the devices, can be easily stolen; all of which adds to the overall cost of maintaining the device as well as losses that may be incurred due to any down time along an assembly line as a result of the theft of a lens or lamp.

SUMMARY OF THE INVENTION

The present invention, which will be described subsequently in greater detail, comprises a headlamp aiming device for properly aiming the headlamps of a vehicle such as an automobile or truck and comprises a base member supporting an outwardly extending projection tube having a light source therein. A cover, resiliently mounted to the base member and radially spaced from the projection tube, surrounds the same and protects the projection tube and light source from external shock loads and the like. Means carried by the base member permits the releasable attachment of the device to the vehicle headlamp.

It is therefore an object of the present invention to provide a new and improved vehicle headlamp aiming device which is extremely accurate, rugged, highly reliable and one which is relatively inexpensive to manufacutre and maintain.

Other objects, advantages, and applications of the present invention will become apparent to those skilled in the art of vehicle headlamp aiming devices when the accompanying description of one example of the best mode contemplated for protecting the invention is read in conjunction with the accompanying drawings.

BRIEF DESCRIPTION OF THE DRAWINGS

The description herein makes reference to the accompanying drawings wherein like reference numerals refer to like components throughout the several views, and in which.

DESCRIPTION OF THE PREFERRED EMBODIMENT

Figure 1:
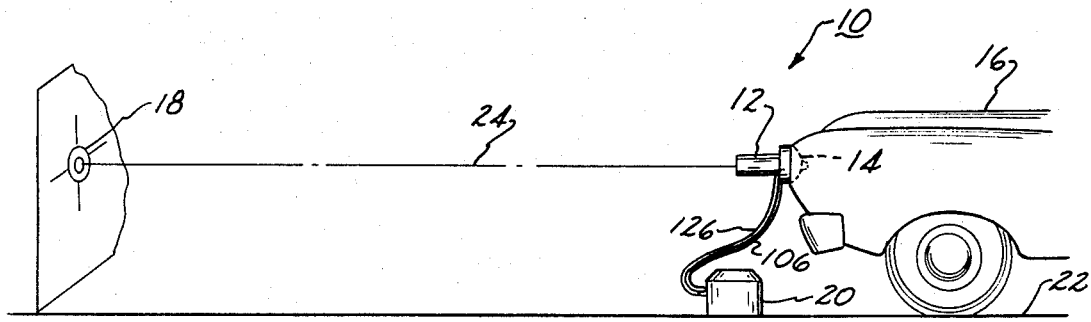
FIG. 1 is a representative illustration of one example of a vehicle headlamp aiming system incorporating the principles of the present invention.

Referring to FIG. 1 for an example of the present invention in the form of a headlamp aiming system 10 comprising a headlamp aiming device 12 releasably attached to the headlamp 14 of a vehicle 16, a target 18 and a control and power source 20. The aiming device 12, which has its own light source, as will be explained hereinafter, is attached to the vehicle 16 after the same is positioned on an aiming pad 22 with the target 18 being positioned between 3 to 30 feet from the vehicle 16, the preferred distance being 25 feet. The target 18 represents the correct aiming point for the particular vehicle 16 whose headlamps 14 are desired to be properly aligned. The direction of the beam of light 24 projected from the aiming device 12 is controlled by adjusting the screws on the headlamp bezel (not shown) and when the beam of light 24 is centered on the target 18, the headlamps 14 are properly aimed.

Figure 2:
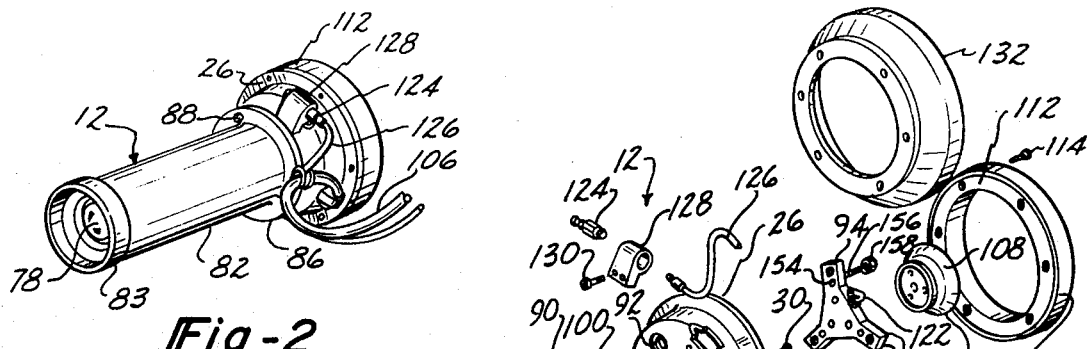
FIG. 2 is a perspective view of a headlamp aiming device employed in the system illustrated in FIG. 1.
Figure 3:
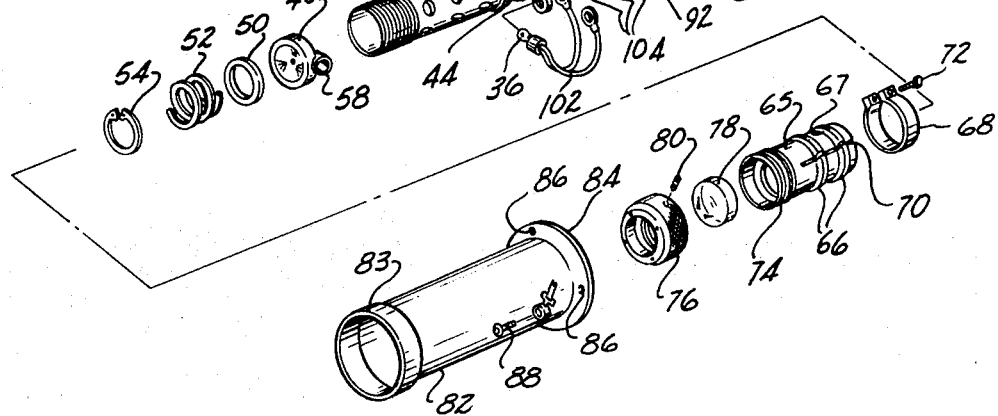
FIG. 3 is an exploded perspective view of the headlamp aiming device illustrated in FIG. 2.
Figure 4:
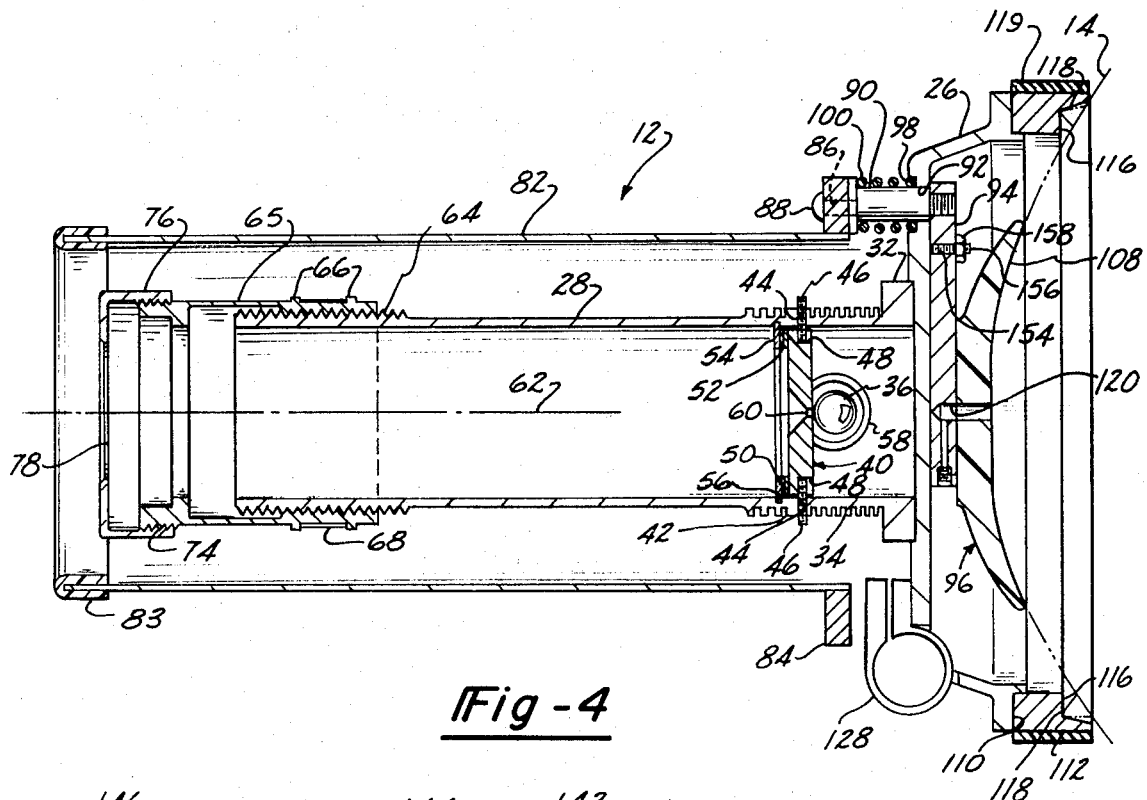
FIG. 4 is a longitudinal cross-sectional view of the headlamp aiming device illustrated in FIG. 2.
Figure 6:
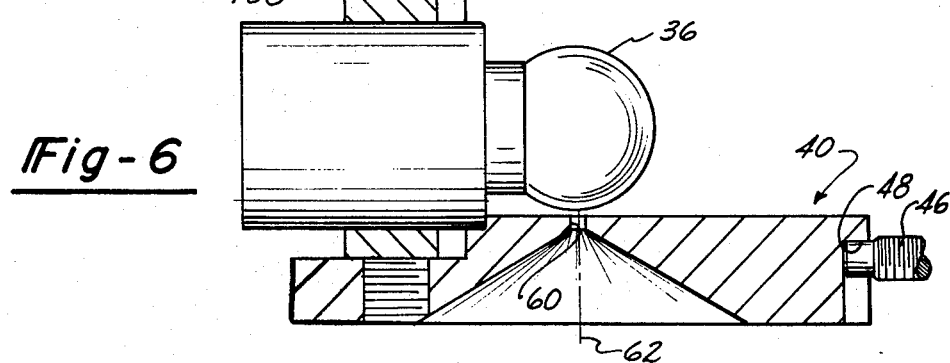
FIG. 6 is an enlarged fragmentary view of the device taken along line 6—6 of FIG. 4.

Referring now to FIGS. 2, 3 and 4, the headlamp aiming device 12 is illustrated as comprising a base member 26 having a projection tube 28 secured to the outer face of the base member 26 by mounting screws 30 extending through the base 26 and engaging an annular flange 32 at one end of the projection tube 28. Immediately adjacent to the flange 32, the outer periphery of the tube 28 is provided with cooling fins 34 which aid in dissipating the heat generated by a projection lamp 36. The fins 34 have diamterically opposed cooling apertures 38 (FIG. 3) which permit the insertion and removal of the lamp 36 into and out of the interior of the tube 28 for attachment to a lamp socket assembly 40 (FIGS. 4 and 6) carried within the tube 28 immediately ahead of the apertures 38. The lamp 36 is inserted through one of the apertures 38 while any suitable instrument may be inserted through the opposed aperture to cause removal of the lamp 36. An enlarged annular ring 42, formed on the outer surface of the tube 28, has a plurality of angularly spaced, radially extending threaded bores 44 which receive adjusting screws 46 (FIGS. 4 and 6), the inner ends of which engage recesses 48 formed about the outer periphery of the lamp socket assembly 40 to limit movement of the same toward the base member 26. The front face of the lamp socket assembly 40 slidably engages a bearing 50 biased thereagainst by a wafer spring 52 and maintained in position by a retainer or snap ring 54 received in an annular groove 56. The lamp socket assembly 40 is provided with a cylindrically shaped mounting socket 58 which receives the projection lamp 36 and positions the same in front of an aperture 60. Since the lamp socket assembly 40 is slidably movable along the adjacent face of the bearing 50, that is, in a plane perpendicular to the longitudinal axis 62 of the projection tube 28, the aperture 60 may be aligned with the axis 62 by proper manipulation of the asjusting screws 46 inwardly or outwardly, their engagement with the lamp socket assembly 40 will shift the same until a proper alignment is achieved.

The outer end 64 of the projection tube 28 is threaded to receive a lens housing 65 having a pair of spaced annular flanges 66 forming a groove 67 thereinbetween which mounts a lens clamp 68. The lens housing 65 has a longitudinal slot 70 (FIG. 3) which permits the peripheral section of the lens housing 65 to be reduced in size and securely fastened to the projection tube end 64 when the lens clamp 68 is tightened by a screw 72 and thereby adding to the overall strength of the device 12 as well as preventing the unauthorized removal of the lens housing 65 from the projection tube 28. The outer end 74 of the lens housing 65 is threaded to receive a lens retainer 76 which, in turn, mounts a lens 78 therein. A set screw 80 (FIG. 3) extends radially through the lens retainer 76 and engages the threaded end 74 of the lens housing 65 to provide an additional means of preventing the unauthorized removal of the lens 78 as the set screw 80 is neither accessable or noticable when a protective cover 82 is positioned over the lens housing 65 and the projection tube 28, as will be explained hereinafter.

The protective cover 82 is cylindrically shaped and has a radially extending flange 84 with a plurality of angularly spaced bores 86 through which mounting screws 88 extend for engagement with mounting studs 90 which, in turn, extend through aligned bores 92 in the base member 26 and into a threaded engagement with the support arms 94 of a vacuum cup assembly 96, and thus the protective cover 82 is fixedly attached to the vacuum cup assembly 96 whereby both elements are movable with respect to the base member 26. As can best be seen in FIG. 4, each base member bore 92 has an annular step 98 which receives and supports one end of a coil spring 100 which, in turn, surrounds its associated mounting stud 90 and bears against an enlarged head portion thereon to urge the studs 90, and thus the protective cover 82, away from the outer face of the base member 26 while urging the vacuum cup assembly 96 toward the base member 26. The cover 82, when in the position described, completely surrounds the projection tube 28, the lens housing 65 and retainer 76 in a radially spaced, concentric fashion. The outermost end of the protective cover 82 is provided with a shock absorbing ring 83 fabricated from any suitable material such as a polyurethane material.

It can thus be seen that the protective cover 82 functions to conceal the set screw 80 and the lens clamp 68 as well as protect the lens 78, lens housing 65, projection tube 28, projection lamp 36 and the setting of the lamp socket aperture 60 along the longitudinal axis 62 of the tube 28. In addition, the cover 82 functions to mount the vacuum cup assembly 96 in such a manner that its position with respect to the base member 26 may be selectively varied, as will be explained hereinafter.

Lead wires 102 (FIG. 3) extend from the projection lamp 36 through the base member 26 for connection by any suitable electrical fastener and insulating means 104 to an external cable 106 which, in turn, is connected to the control and power source 20, as will be explained hereinafter.

The vacuum cup assembly 96 comprises the aforementioned support arms 94 and a vacuum cup 108 preferably fabricated from a urethane and molded to the arms 94. The vacuum cup 108 is adapted to be positioned on the glass surface of the headlamp 14 and when a suction or vacuum is created thereinbetween, as will be explained, the device 12 is secured to the headlamp 14.

The outer peripheral surface of the base member 26 has an annular recess 110 (FIG. 4) which receives an adapted ring 112 which is preferably formed from an anodized aluminum and held in place by mounting screws 114 extending through the ring 112 into the base member 26. The adapter ring 112, in turn, has an annular recess 116 which receives the three alignment nubs 118 formed on the glass face of the headlamp 14 to properly align the projection tube 28 with the filaments of the headlamp 14. Thus, when the device 12 is positioned against the headlamp 14, the adapter ring 112 engages the headlamp nubs 118 while the vacuum cup 108 functions to attach the device 14 to the headlamp 14 and hold the adapter ring 112 in position. The outer periphery of the ring 112 is provided with a shock absorbing ring 119 fabricated from any suitable material such as polyurethane.

The vacuum source, which is generated in the control and power source 20, is connected to the vacuum cup 108 through a right angle bore 120 (FIG. 4) in the support arms 94, an internal conduit 122, a vacuum release valve 124 and an external conduit 126. The vacuum release valve 124 is mounted to the base member 26 by means of a valve bracket 128 and mounting screw 130.

It should be noted that the adapter ring 112, which is usable with the smaller conventional dual headlamps may be replaced by a larger adapted ring 132 (FIG. 3) which is designed to mate with the nubs of the larger single headlamps, and thus the basic device 12 may be easily modified to adjust and aim headlamps of varying sizes.

Figure 5:
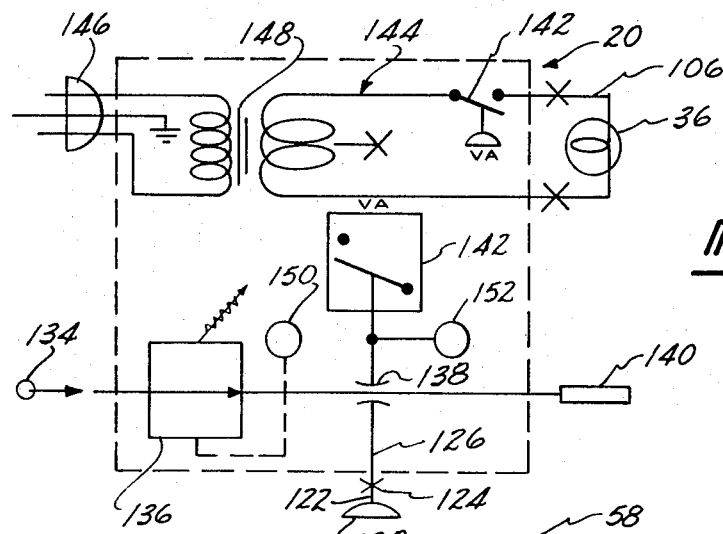
FIG. 5 is a schematic diagram of the system illustrated in FIG. 1.

Referring now to FIG. 5, the control and power source 20 is illustrated as comprising a source of pressure 134, such as compressed air between 40 and 80 PSI, communicating through a pressure regulator 136 with a venturi 138 and exhausted to atmosphere through a muffler 140. The venturi 138 functions in a known manner to generate a vacuum in the conduit 126 which, as aforementioned, communicates with the suction cup 108 via the vacuum release valve 124. A vacuum switch 142 is connected to the venturi 138 and functions to make or break an electrical connection in the electrical circuit 144 in response to the creation of a vacuum in the vacuum cup 108 when same is placed against the headlamps 14. Pressure gauge 150 and vacuum gauge 152, respectively connected to the pressure regulator 136 and the venturi 138 provide the operator of the headlamp device 12 with a visual indication of the regulated pressure and operating vacuum.

The electrical circuit 144 comprises a source of electrical power 146 connected to the power coil of a transformer 148 while the output coil of the transformer 148 is connected in series with the vacuum switch 142 and the projection lamp 36 via cable 106. It can thus be seen that when the vacuum suction cup 108 is positioned on the face of the headlamp 14, as aforementioned, and a vacuum is generated thereinbetween, the vacuum switch 142 is activated to electrically connect the transformer 148 to the projection lamp 36 and thus the lamp 36 is turned on automatically by the coupling of the device 12 to the headlamp 14. When the vacuum release valve 124 is pressed to remove the vacuum in the cup 108 to detach the device 12 from the headlamp 14, the vacuum swith 142 automatically functions to break the connection between the projection lamp 36 and the transformer 148.

It can thus be seen that the present invention provides a new and improved headlamp aiming device which is rugged, reliable, and accurate, as well as having theft prevention means to prevent the unauthorized removal of the lens and projection lamp.

It should be noted that each arm 94 of the vacuum cup assembly 96 has a threaded bore 154 through which a screw 156 extends and abuttingly engages the back side of the base member 26. By adjusting the amount of such engagement between the screws 156 and the base member 26, the distance between the base member 26 and the vacuum cup assembly 96 may be selectively varied so as to accomodate headlamps of different size, that is, headlamps having different face curvatures and which different headlamps may project into the adapter ring 112 a distance that varies depending upon the design employed by the headlamp manufacture. Nuts 158 lock the screws 156 at the desired position.

It should be further noted that the vacuum switch 142 is set at a level of vacuum that is higher than the vacuum experienced when the device 12 is not attached to the headlamp 14 such that the lamp 36 will be turned on only when the device 12 is attached to the headlamp.

Although only one form of the invention has been disclosed, it is to be understood by those skilled in the art that other forms may be had, all coming within the spirit of the invention and scope of the appended claims.

What is claimed is as follows:

1. In a headlamp aiming device for properly aiming headlamp of a vehicle, the aiming device having:
    a base member;
    a projection tube having one end carried on one side of said base member, the other end extending outwardly therefrom;
    light projecting means carried within said projection tube for projecting a beam of light through said other end of said projection tube;
    securing means disposed on the other side of said base member for releasably securing said device to a light transmitting face of said headlamp; the improvement comprising:
    a protective housing extending outwardly from said one side of said base member and surrounding said projection tube and radially spaced therefrom;
    a plurality of circumferentially spaced connecting members extending through said base member for fastening said housing to said securing means such that said housing and said securing means are movable with respect to said base member; and spring means for urging said housing away from said one side of said base member.

2. The headlamp aiming device defined in claim 1 wherein said spring means comprises a plurality of springs carried by said connecting member and disposed between said one side of said base member and said protective housing said springs urging said securing means toward said base member and urging said housing away from said base member.

3. The headlamp aiming device in claim 1, further comprising means for selectively varying the distance between said releasably securing means and said other side of said base member.

4. The headlamp aiming device defined in claim 1, wherein said light projecting means comprises a support member carried within said projection tube and disposed in a plane which is perpendicular to the longitudinal axis of said projection tube, said support member carrying a light source on the side thereof facing said one end of said projection tube, said support member having an aperture through which a beam of light from said light source passes and which is emitted from said other end of said projection tube, and means carried by said tube for supporting said support member in said plane, said last mentioned means being adapted to selectively move said support member in said plane for aligning said light beam along the longitudinal axis of said tube.

5. The headlamp aiming device defined in claim 1, wherein said releasably securing means comprises a flexible cup member having an outer curvature which is complementary to the curvature of said light transmitting face of said headlamp;
    vacuum generating means; and
    switching means selectively connectable to said cup member and said vacuum generating means to secure said device to said headlamp.

6. The headlamp aiming device defined in claim 5, further comprising means for energizing said light projecting means in response to said switching means becoming operable.

7. The headlamp aiming device defined in claim 1, further comprising an adapter ring carried by said other side of said base member, said adapter ring being of a predetermined size and shape to mate with a headlamp of a predetermined size, said adapter ring and headlamp having cooperating means to permit a predetermined alighment of said device on said headlamp, said adapter ring being removably attached to said base member to permit removal therefrom and replacement with adapter rings adapted for attachment to varying sized headlamps.

8. The headlamp aiming device defined in claim 1, further comprising a lens; means mounting said lens at the other end of said projection tube, said housing extending outwardly from said base member a predetermined distance beyond said other end of said projection tube.

9. In a device for projecting a beam of light, and having:
    a base member;
    a projection tube having one end carried on one side of said base member, the other end extending outwardly therefrom;
    light projecting means carried within said projection tube for projecting a beam of light through said other end of said projection tube; the improvement comprising;
    a protective housing extending outwardly from said one side of said base member surrounding said projection tube and radially spaced therefrom;
    means carried on the other side of said base member for securing said device to a desired mounting fixture;
    a plurality of circumferentially spaced fastening means extending through said base member for attaching said housing to said securing means such that said securing means and said housing are movable with respect to said base member; and spring means carried by said fastening means for urging said securing means toward said base member and urging said housing away from said base member.

* * * * *